(12) United States Patent
Pace

(10) Patent No.: US 6,729,651 B2
(45) Date of Patent: May 4, 2004

(54) SYSTEMS AND METHODS FOR PROVIDING A RECREATIONAL SLED DEVICE

(75) Inventor: Bryan L. Pace, Kaysville, UT (US)

(73) Assignee: Elite Sports, LLC, Kaysville, UT (US)

(*) Notice: Subject to any disclaimer, the term of this patent is extended or adjusted under 35 U.S.C. 154(b) by 0 days.

(21) Appl. No.: 10/353,355

(22) Filed: Jan. 28, 2003

(65) Prior Publication Data

US 2003/0141683 A1 Jul. 31, 2003

Related U.S. Application Data

(60) Provisional application No. 60/352,988, filed on Jan. 29, 2002, and provisional application No. 60/417,030, filed on Oct. 7, 2002.

(51) Int. Cl.[7] .................................................. B62B 9/04
(52) U.S. Cl. ............................ 280/845; 280/18; 280/28; 280/28.14
(58) Field of Search .......................... 280/845, 15, 16, 280/18, 18.1, 21.1, 28, 28.16, 900, 28.12, 28.5, 28.14

(56) References Cited

U.S. PATENT DOCUMENTS

| | | | |
|---|---|---|---|
| 3,442,522 A | * 5/1969 | Spilhaus | 280/841 |
| 3,606,366 A | * 9/1971 | Engelberger | 280/841 |
| 4,025,082 A | 5/1977 | Lummus | 280/12 H |
| 4,054,257 A | 10/1977 | Miller, Jr. | 249/97 |
| 5,039,130 A | 8/1991 | Sheiman | 280/845 |
| 5,181,741 A | 1/1993 | Sheiman et al. | 280/845 |
| 5,704,622 A | 1/1998 | Weekley | 280/21.1 |
| 6,209,894 B1 | 4/2001 | Walker, IV | 280/87.042 |
| 6,431,560 B2 | * 8/2002 | Cummings | 280/14.21 |
| 2001/0033076 A1 | 10/2001 | Cummings | 280/845 |

* cited by examiner

*Primary Examiner*—Brian L. Johnson
*Assistant Examiner*—Bridget Avery
(74) *Attorney, Agent, or Firm*—David B. Tingey; Kirton & McConkie

(57) ABSTRACT

Systems and methods for providing a recreational sled that is configured to selectively enable a user to carry a sliding mechanism up an incline and/or to support the user on the mechanism and allow the user to travel a distance down the incline. A seat is coupled to at least one of a winter sliding mechanism and a non-winter sliding mechanism. A user selectively uses at least one of the sliding mechanisms to slide down a snowy/icy incline or to slide down a non-snowy/non-icy incline.

12 Claims, 3 Drawing Sheets

SYSTEMS AND METHODS FOR PROVIDING A RECREATIONAL SLED DEVICE

RELATED APPLICATIONS

This application claims priority to U.S. Provisional Patent Application Ser. No. 60/352,988 filed Jan. 29, 2002, entitled SYSTEMS AND METHODS FOR PROVIDING A RECREATIONAL SLED DEVICE, and to U.S. Provisional Patent Application Ser. No. 60/417,030 filed Oct. 7, 2002, entitled SYSTEMS AND METHODS FOR PROVIDING A MULTI-SEASONAL RECREATIONAL SLED DEVICE, both of which are incorporated herein by reference.

BACKGROUND OF THE INVENTION

1. Field of the Invention

The present invention relates to providing a recreational sled device. In particular, the present invention relates to systems and methods for providing a sled that is configured to selectively enable a user to carry a sliding mechanism up an incline and/or support the user on the mechanism and allow the user to travel a distance down the incline. In at least some implementations of the present invention, the recreational sled device is multi-seasonal, wherein the sled device includes a winter portion for selective use down a snowy/icy incline and a non-winter portion for selective use down a non-snowy/non-icy incline.

2. Background and Related Art

A snow-covered incline has traditionally been used for recreational enjoyment. Children and adults alike have typically employed sleds, inner tubes, toboggans, and other similar devices to slide down snow-covered inclines. Such devices enable one or more users to sit or lie down on the device while sliding down a snow-covered incline. Other devices, such as skis and snowboards, exist that are configured to enable users to stand while sliding down a snow-covered incline.

While the devices that are currently available have provided enjoyment of sliding down a snow-covered incline, the absence of snow prevents such enjoyment. Therefore, such enjoyment is restricted to the winter months and to locations where snow falls.

In order to provide similar enjoyment during summer months and/or in areas where snow is not located, a variety of techniques and devices are available. For example, consumers are able to utilize skies that are designed for use on a grassy ski slope. Also, individuals utilize a block of ice to slide down a grassy hill. This recreational sport is commonly referred to as "ice blocking."

Ice blocking includes an ice block and a towel or other piece of material. The ice block is carried by the user up a hill and placed on the ground. The towel is placed on top of the ice block to provide a seat for the user. The user sits on top of the towel and slides down the incline of the hill.

While the ice blocking technique enables a user to slide down an incline, the user typically experiences several undesirable conditions. For example, because of the cold temperature of the ice block, the towel is commonly used to carry the block up the hill. As such, the towel becomes wet. The towel further becomes wet from continued use and thus provides an undesirable seat for the user.

Another problem with current techniques is that the ice block has the tendency to escape from under the towel and/or the user. As such, the user can become wet, dirty and/or injured in the process. Therefore, young children may not participate in the recreational activity because of the risk of injury.

Thus, while techniques currently exist that enable a user to slide down an incline, challenges still exist. Accordingly, it would be an advancement in the art to augment or even replace current techniques with other techniques.

SUMMARY OF THE INVENTION

The present invention relates to providing a recreational sled device. In particular, the present invention relates to systems and methods for providing a sled that is configured to selectively enable a user to carry a sliding mechanism up an incline and/or support the user on the mechanism and allow the user to travel a distance down the incline. In at least some implementations of the present invention, the recreational sled device is multi-seasonal, wherein the sled device includes a winter portion for selective use down a snowy/icy incline and a non-winter portion for selective use down a non-snowy/non-icy incline.

Implementation of the present invention takes place in association with a sled device that enables a user to selectively slide down an incline. The sled device includes a seat and a sliding mechanism. In at least some implementations, the sliding mechanism includes a winter portion/mechanism for use down a snowy/icy incline and/or a non-winter portion/mechanism for use down a non-snowy/non-icy incline.

In one implementation, the non-winter portion/mechanism includes a block of ice or other slick surface that facilitates sliding down a grassy incline. Other examples of non-winter portions/mechanisms include wheels, rollers, tracks, belts, or other mechanisms to enable movement, and other such sliding systems in concert with or in place of the block of ice or slick surface to enable a user to slide down an incline.

In one implementation, the winter portion/mechanism includes a slick surface for sliding down a snowy/icy incline. Other examples of winter portions/mechanisms include one or more surfaces, blades, skis, intertubes or other systems or devices, including an ice block, for sliding down a snowy/icy incline.

In at least some implementations, the sled device includes a receiver is configured to receive a sliding mechanism. Accordingly, a sliding mechanism is selectively coupled to the receiver for use in sliding down an incline. Thus, the type of sliding mechanism (e.g., winter and/or non-winter portions/mechanisms) used depends on present weather and/or or conditions.

In a further implementation, the receiver is part of a containing mechanism that is used to contain the sliding mechanism, thereby preventing the sliding mechanism from decoupling or otherwise escaping from the seat of the sled device when the sled device is supporting a user. In one implementation, the containing mechanism is coupled to the seat or surface, which is configured to receive a user thereon for riding down an incline or across a surface. The containing mechanism and/or seat further facilitate carrying the sliding mechanism up an incline.

Implementations of the present invention also embrace sled devices that may be used by more than one rider at a time. Furthermore, implementations of the present invention embrace an ability to interconnect sled devices for use.

While the methods and processes of the present invention have proven to be particularly useful in the area of providing a surface for a user to sit thereon, those skilled in the art can appreciate that the methods and processes can be used in a variety of different applications and in a variety of different areas of manufacture to yield a variety of different devices that may be marketed for sliding down an incline, including devices that allow a user to lie, kneel, or stand on while sliding. Moreover, those skilled in the art will appreciate that the methods and processes of the present invention embrace utilization of only a winter sliding mechanism for sliding, utilization of only a non-winter sliding mechanism for sliding, utilization of a receiver that selectively receives a winter sliding mechanism and/or a non-winter sliding mechanism, and utilization of a receiver that includes a receiver for receiving a sliding mechanism that has a winter portion/mechanism and/or a non-winter portion/mechanism.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to providing a recreational sled device. In particular, the present invention relates to systems and methods for providing a sled that is configured to selectively enable a user to carry a sliding mechanism up an incline and/or support the user on the mechanism and allow the user to travel a distance down the incline and/or across a surface. In at least some embodiments of the present invention, the recreational sled device is multi-seasonal, wherein the sled device includes a winter sliding mechanism for selective use down a snowy/icy incline and a non-winter sliding mechanism for selective use down a non-snowy/non-icy incline.

Embodiments of the present invention take place in association with a sliding mechanism that enables a user to selectively slide across a surface and/or down an incline. In the disclosure and in the claims, the term "sliding mechanism" shall refer to any system, material, and/or device that enables a user or users to slide or glide across a surface, including down an incline. Examples of sliding mechanisms include a block of ice or other material that provides a slick surface to enable sliding, rollers, wheels, belted mechanisms, tracks, one or more skis, blades, intertubes, surfaces and/or other such sliding devices or systems. Furthermore, the sliding mechanisms may be used in association with one or more of a variety of different types of terrain, including on grass, dirt, snow, ice, sand, or any other type of terrain.

Embodiments of the present invention embrace the use of a recreational sled device that may be selectively used to slide down an incline and/or across a surface and may be used to facilitate the carrying of the sliding mechanism up an incline or across a surface. In one embodiment, a recreational sled device comprises a sliding mechanism configured to selectively enable movement of the sled device down an incline, a supporting surface or seat coupled to or associated with at least a portion of the sliding mechanism, and a containing mechanism that is coupled to the supporting surface or seat and is configured to contain at least a portion of the sliding mechanism to prevent the sliding mechanism from escaping from under the supporting surface or seat while supporting a user.

Some embodiments of the present invention embrace utilization of a sliding mechanism that enables sliding on a non-wintry surface/incline. Other embodiments embrace utilization of a sliding mechanism that enables sliding on a wintry surface/incline. Other embodiments embrace the utilization of more than one sliding mechanism. At least some embodiments embrace a sliding mechanism having a winter portion/mechanism and a non-winter portion/mechanism. Some embodiments embrace a sliding mechanism that is removable with respect to a receiver coupled to a user-supporting surface, while other embodiments embrace a sliding mechanism that is fixed with respect to a user-supporting surface.

Figure 1:
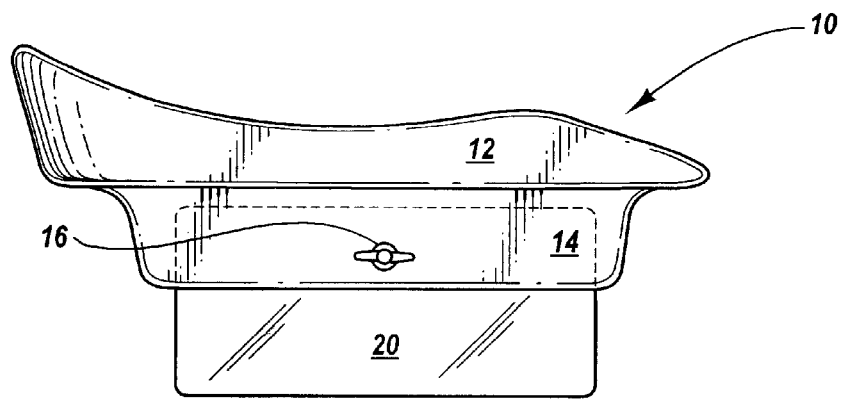
FIG. 1 illustrates a representative embodiment of a recreational sled device in accordance with the present invention.
Figure 2:
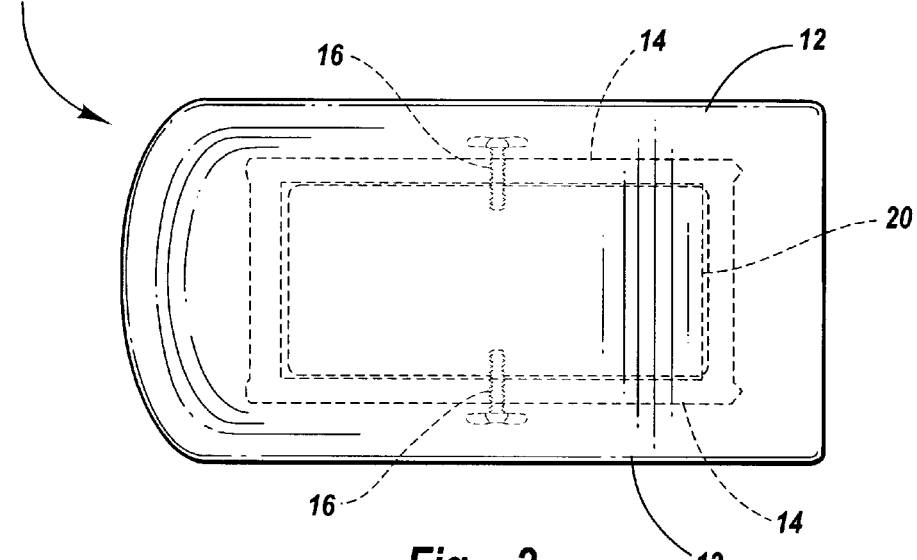
FIG. 2 illustrates a top view of the recreational sled device of FIG. 1 that includes a fastener.
Figure 3:
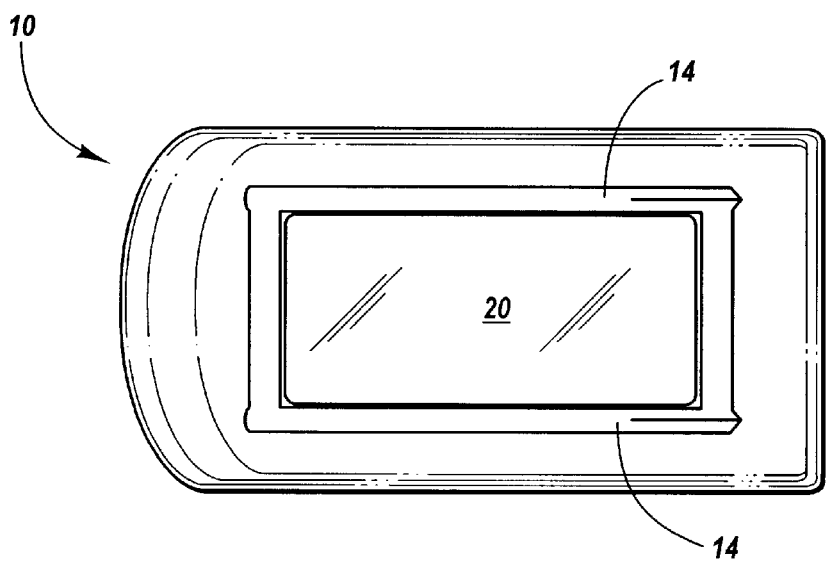
FIG. 3 illustrates a bottom view of the recreational sled device of FIG. 1 that does not include a fastener.

With reference to FIGS. 1–3, a representative embodiment of a recreational sled device is provided. FIG. 1 illustrates a side view of the representative sled device. FIG. 2 illustrates a top view of the representative sled device, wherein a sliding mechanism is located underneath a surface, such as a seat or similar surface. FIG. 3 illustrates a bottom view of the representative sled device.

In accordance with embodiments of the present invention, a user may sit, lie, kneel, or stand on a user-supporting surface of a sled device while sliding down an incline or across a surface. With reference to FIG. 1, sled 10 includes seat 12 and receiver 14, which is configured to receive at least a portion of sliding mechanism 20. Seat 12 is an example of a user-supporting surface. In FIG. 1, seat 12 is associated with a non-winter sliding mechanism (e.g., a block of ice) that is configured for association with receiver 14. The non-winter sliding mechanism enables sled device 10 to be used, for example, on non-snowy and/or non-icy surfaces. Other examples of non-winter sliding mechanisms include a system or device that includes a slick surface, one or more wheels, rollers, tracks, belts or other mechanisms that enable movement, and/or other sliding systems.

In the illustrated embodiment, the ice block is a standard size that is readily available to consumers. Alternatively, those skilled in the art will appreciate that embodiments of the present invention also embrace the use of a variety of different sizes and/or configurations of one or more ice blocks.

In the illustrated embodiment of FIG. 1, seat 12 is configured for comfort of the user. In another embodiment, a user-supporting surface is generally flat to enable a user to lie thereon. The surface or seat may be constructed out of a variety of materials, including plastic, fiberglass, metal, wood, or other such materials. Those skilled in the art will appreciate that embodiments of the present invention embrace a variety of different sizes, dimensions, shapes, patterns, and/or configurations that may be used in accordance with the present invention. In one embodiment, an impression is located in the seat to provide comfort. In a further embodiment, the seat or supporting surface is cushioned.

In the illustrated embodiment, the user-supporting surface is a seat 12 that comprises plastic or another polymer. The seat is formed by using the process of blow molding or another manufacturing technique, such vacuum, rotational, or injection molding. While the embodiment illustrated in FIG. 1 provides no back support, other embodiments of the present invention include additional supports for a user's back or legs, and may include other supports. For example, embodiments of the present invention further embrace the use of handles or braking mechanisms that allow for stability and/or slowing down or stopping motion of the recreational sled device.

While not necessary, the embodiment of FIG. 1 also includes a fastener 16 that may be used in coupling sliding mechanism 20 to receiver 14. Examples of fasteners for use in coupling a sliding mechanism include one or more pins, levers, coupling surfaces, hooks, screws, connectors and the like. Fastener 16 facilitates adjustment of sliding mechanism 20 and/or the carrying of sliding mechanism 20 by a user.

While FIG. 1 illustrates the use of fastener 16, those skilled in the art will appreciate that embodiments of the present invention also embrace the absence of a fastener/connector. For example, a sliding mechanism and a receiver may couple through a pressure-fit connection. Alternatively, a sliding mechanism may be contained within a receiver, but allowed to move within the receiver. For example, a U-shaped receiver, a box-shaped receiver, or another type of receiver may be used that allows a sliding mechanism to move within the receiver, as will be further discussed below.

In FIG. 1, receiver 14 includes one or more vertical supports that are coupled to the horizontal surface or seat 12 and is configured to receive a sliding mechanism 20, such as a block of ice or other sliding mechanism. As illustrated in FIGS. 2–3, receiver 14 includes four vertical sides that form a box-shape or cavity configured to receive sliding mechanism 20. The vertical sides of receiver 14 extend down the sides, front and back of sliding mechanism 20 (e.g. the ice block) to maintain or otherwise contain sliding mechanism 20 (e.g., the ice block) within receiver 14 and underneath seat 12 while supporting a user.

Accordingly, receiver 14 may be used as a containing mechanism to contain sliding mechanism 20 while sled 10 supports a user and does not require the use of fastener 16. For example, when sliding mechanism is a standard-sized block of ice, the ice block is able to move within receiver 14 and is prevented from escaping while sled 10 supports a user. The vertical walls of receiver 14 also facilitate a user in carrying sliding mechanism 20. Thus, when fastener 16 is not used or included, sliding mechanism 20 is still contained within the vertical sides of receiver 14 while a user is being supported. Alternatively, when fastener 16 is used, sliding mechanism 20 may be selectively positioned within receiver 14 and may further aid in containing sliding mechanism 20 (e.g., the ice block) within receiver 14 and underneath seat 12.

In some embodiments, vertical adjustment of the sliding mechanism is enabled. Thus, for example, as the ice block melts, a containing mechanism adjusts to allow the block to remain in contact with the incline. In one embodiment, one or more fasteners 16 may be used and adjusted to provide vertical adjustment of the sliding mechanism. In another embodiment, the containing mechanism includes a biasing mechanism. For example, the biasing mechanism biases the block away from the seat and/or towards the incline. In one embodiment, the containing mechanism is open from the bottom and allows for the block of ice to freely move within the containing mechanism, but prevents the block of ice from escaping from within the containing mechanism when a user is supported.

In the illustrated embodiment, the containing mechanism comprises a box-type structure/receiver 14 that equally encompasses four sides of a block of ice. The four vertical walls or surfaces of the box extend down the block of ice to sufficiently provide a secure mounting to the block of ice. As such, the block is contained within the box while supporting a user even when the block has experienced some melting. In a further embodiment, the block of ice is enabled to freely move within the box. The vertical walls also facilitate a user in carrying sliding mechanism 20, such as up an incline.

In one embodiment, the under side of the seat includes one or more simple mechanical devices that allow a greater level of stability and security in the mounting of the seat to the ice. The containing device in one embodiment includes two or more threaded bolts that have the ability to adjust in and out, illustrated as fastener 16. The bolts in one embodiment include a plastic rubber cap or pad on the end that comes in contact with the block of ice. The bolts or pins may be positioned in any location around the box structure. In the illustrated embodiment, a hole is provided that is configured to receive connector 16 which extends through the vertical side of the containing mechanism.

In a further embodiment, connector 16 is used to secure a winter sliding mechanism to the containing mechanism, as will be further discussed below. In an alternative embodiment, one or more vertical arms are configured to grasp the ice while the under side of the seat includes a device to prevent the ice from sliding off.

With reference to FIG. 2, a top view of sled device 10 is provided that illustrates the maintaining of sliding mechanism 20. As provided above, the vertical walls of receiver 14 extend down and prevent the escape of sliding mechanism 20 (e.g., block of ice) when a sled 10 supports a user. While not necessary, fasteners 16 may be used to extend into sliding mechanism 20 to facilitate maintaining and/or adjusting sliding mechanism 20, and to facilitate carrying sliding mechanism 20 up an incline.

With reference to FIG. 3, a bottom view of sled device 10 is provided that illustrates maintaining and/or containing of sliding mechanism 20. As provided above, the vertical walls of receiver 14 extend down and prevent the escape of sliding mechanism 20, and facilitate a user in carrying sliding mechanism 20. Receiver 14 also allows for a variety of different sizes and/or shapes of sliding mechanisms. For example, receiver 14 allows for a variety of different sizes and/or shapes of ice blocks, including a standard sized ice block available to consumers. Moreover, receiver 14 allows for an ice block to be flipped or rotated so that any side of the ice block may be used to enable sliding. Accordingly, once one side of an ice block has become chipped, unusable or undesirable, the block can be flipped so that another side of the same ice block is used without requiring a new ice block to be obtained. Moreover, a customized ice block is not required.

Embodiments of the present invention further embrace devices that allow for multiple users and may comprise multiple sliding mechanisms and/or multiple containing mechanisms. For example, a seat may be designed to accommodate a side-by-side or front-and-back rider combination. The number of sliding mechanisms may vary from one to many in accordance with the present invention. Moreover, embodiments of the present invention contemplate the interconnection of multiple sled devices.

Figure 4:
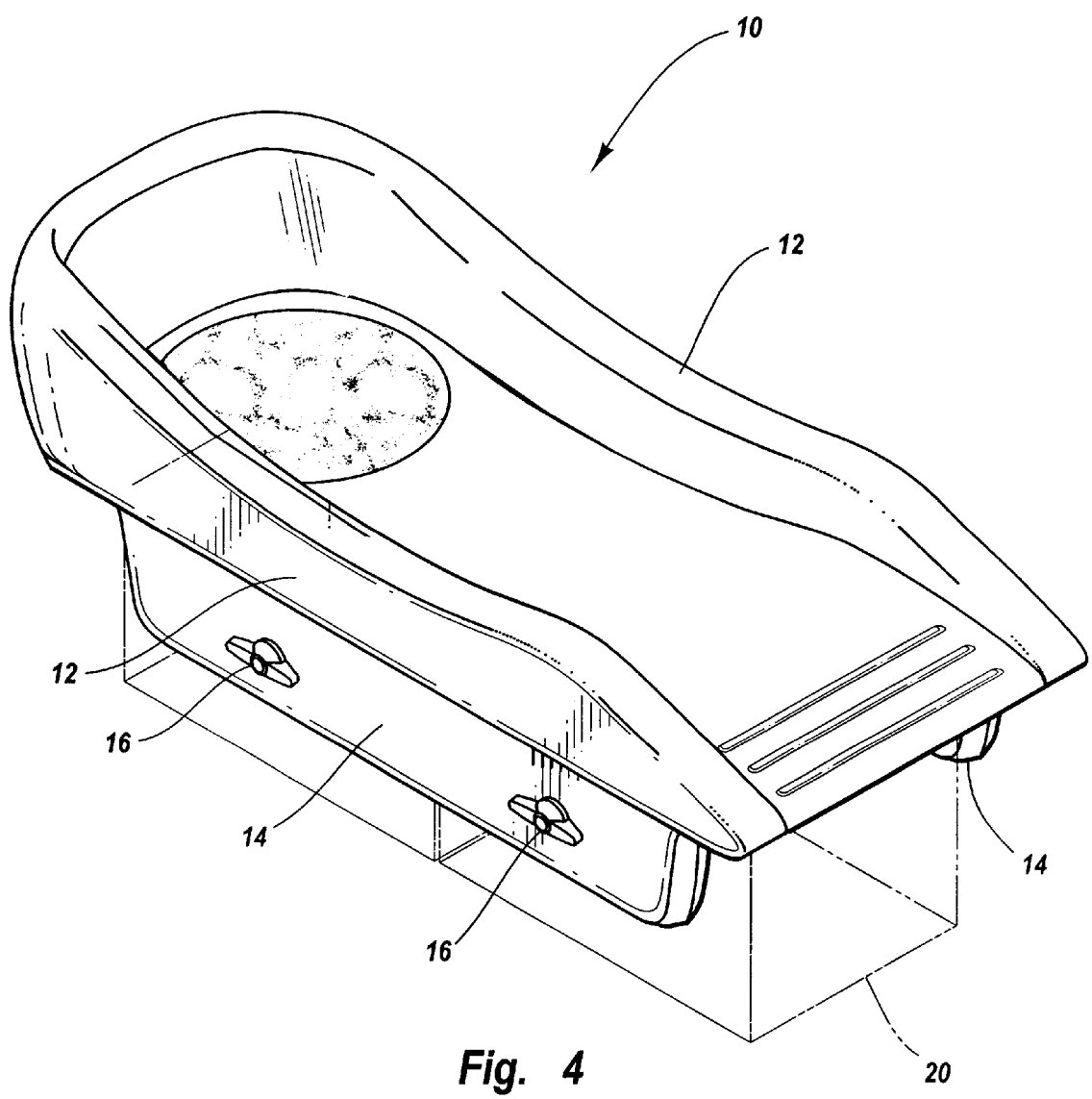
FIG. 4 illustrates another representative embodiment of a recreational sled device in accordance with the present invention.

With reference now to FIG. 4, another representative embodiment of a recreational sled device is illustrated. In FIG. 4, seat 12 includes vertical walls to retain one or more users therein, such as children or other users. Furthermore, receiver 14 includes a plurality of vertical walls that, in one embodiment, may be used as a sliding mechanism (e.g. as blades) in winter conditions and may be coupled or otherwise associated with one or more other types of sliding mechanisms 20 (e.g., blocks of ice, wheels or other sliding mechanisms) for sliding in wintry conditions or in other conditions, such as on a non-snowy/non-icy incline. While receiver 14 of FIG. 4 includes two vertical walls that are parallel, other embodiments include a back wall coupling the two parallel walls to form a U-shaped configuration, or a back wall and a front wall coupling the two parallel was to form a box-shaped configuration (as illustrated in FIG. 3) to receive one or more sliding mechanisms. Moreover, FIG. 4 optionally includes multiple fasteners 16 to adjust and/or retain corresponding sliding mechanisms, and/one or more mechanisms to provide a bias.

In at least some embodiments, a receiver or containing mechanism is configured to receive a winter sliding mechanism to enable coupling and use down a snowy/icy surface. Further, seat 12 may be selectively coupled to a winter portion/mechanism and/or a non-winter portion/mechanism for selective use in sliding down an incline or across a surface for recreational enjoyment. In one embodiment, the sliding mechanism is one device, wherein the winter portion and the non-winter portion are, for example, on opposing surfaces, such that during the winter months the seat is coupled to the non-winter portion to allow the winter portion to be employed to enable sliding down a snowy/icy surface, and during the non-winter months the seat is coupled to the winter portion to allow the non-winter portion to be employed to enable sliding down a non-snowy/non-icy surface.

Those skilled in the art will appreciate that the embodiments of the present invention embrace a variety of different configurations and/or materials to provide a recreational sled device for use during any season and in any type of weather condition.

Figure 5:
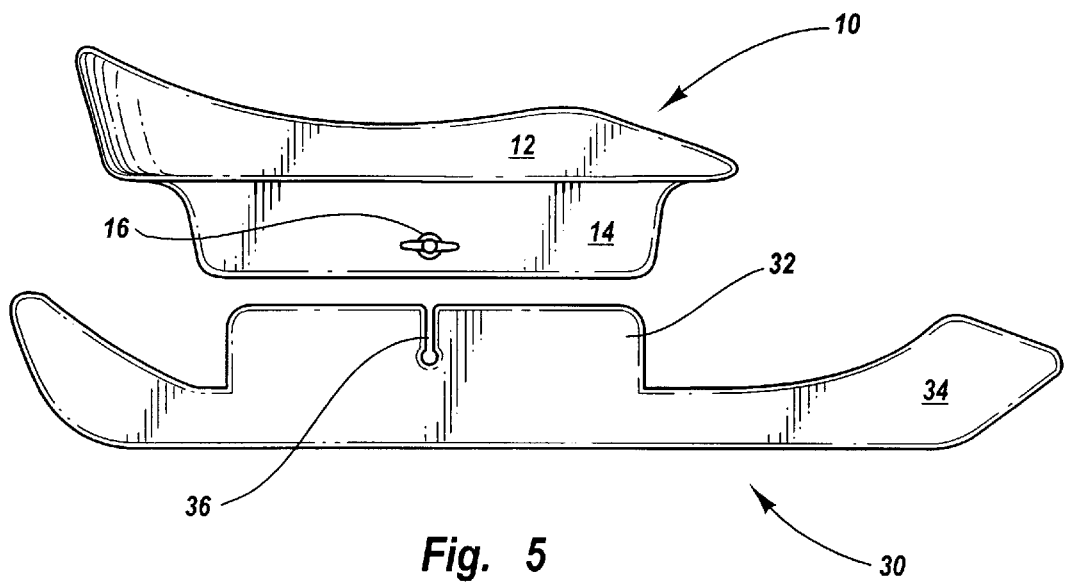
FIG. 5 illustrates a selective coupling/decoupling of a sliding mechanism.
Figure 6:
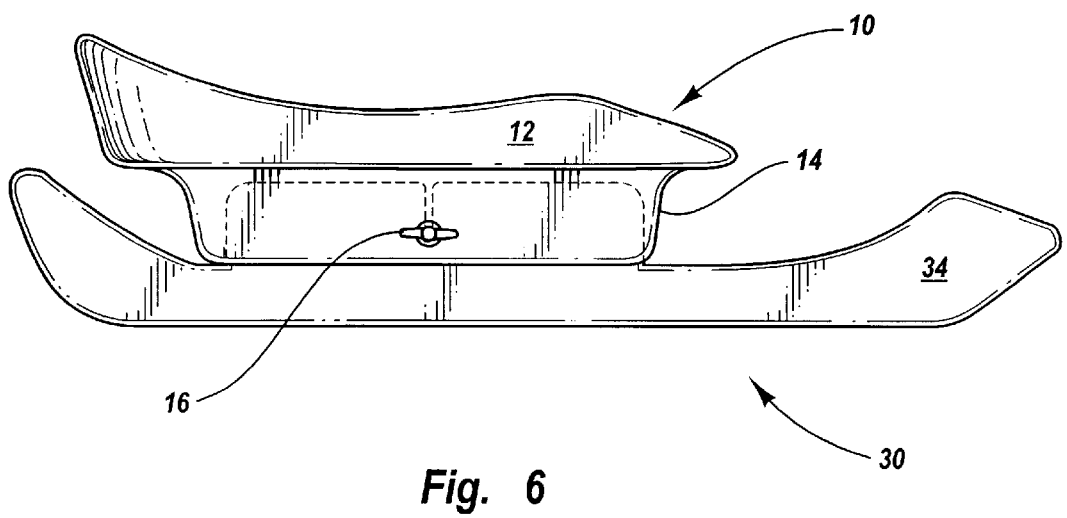
FIG. 6 illustrates another representative embodiment of a recreational sled device in accordance with the present invention.

With reference to FIG. 5, a representative embodiment is illustrated of a multi-seasonal recreational sled 10. Sled 10 includes a user-supporting surface or seat 12 that is selectively coupled to a winter sliding mechanism 30. With the winter sliding mechanism 30 portion coupled thereto, as illustrated in FIG. 6, the sled may be used on snowy and/or icy surfaces. Winter sliding mechanism 30 includes one or more blades 34 for use in sliding across or down a snowy/icy surface. Other embodiments include a sliding mechanism that comprises one or more skis, a slick surface that enables sliding, a saucer, an intertube, or the like that are selectively or fixably coupled to a receiver.

As provided above, in some embodiments, multiple sliding devices are utilized. Accordingly, in one embodiment, portion 32 is hollow and configured to receive a block of ice. Thus, sliding mechanism 30 and an additional sliding mechanism (not shown) are used at the same time. This provides increased sliding capabilities, including slickness, stability and/or support.

While not necessary, the embodiment illustrated in FIGS. 5–6 include a fastener 16 that couples the sliding mechanism 30 to receiver 14. Examples of fasteners or connectors for use in coupling a sliding mechanism with a receiver include one or more pins, levers, coupling surfaces, hooks, and the like. When a second sliding mechanism is used (e.g., an ice block) with sliding mechanism 30, fastener 16 may be used to secure one or more of the sliding mechanisms. As provided herein, while FIGS. 5–6 illustrate the use of a fastener or connector, those skilled in the art will appreciate that sliding mechanisms may couple through a pressure-fit or other connection. Moreover, while the illustrated embodiment includes a slide mechanism 30 that is selectively coupled to receiver 14, other embodiments include a user-supporting surface or seat that is directly coupled to a winter and/or non-winter sliding mechanism.

In FIGS. 5–6, a selective decoupling of the winter sliding mechanism from a receiver is illustrated. In FIG. 5, the winter sliding mechanism 30 is decoupled from the receiver 14, wherein the receiver 14 is coupled to a seat 12 that a user may selectively employ. In the illustrated embodiment, the two portions are decoupled by loosening fastener 16 that holds the two portions together. Alternatively, when the two portions are coupled together by a pressure-fit or insertion coupling, simply pulling the two portions apart from each other may decouple the two portions. Moreover, at least one embodiment of the present invention includes a non-winter portion/mechanism that includes a containing mechanism configured for receipt of a block of ice for sliding across or down a surface. Accordingly, in one embodiment, the winter sliding mechanism includes a portion that resembles the shape of a block of ice for selectively coupling the winter sliding mechanism with the receiver.

In some embodiments, a user-supporting surface is configured for use with one or more of a variety of different sliding mechanisms. Thus, for example, in at least one embodiment, seat 12 illustrated in FIGS. 1–3 and 5–6 is the same seat. Accordingly, in the embodiment, receiver 14 illustrated in FIGS. 1–3 and 5–6 is the same receiver and fastener 16 illustrated in FIGS. 1–3 and 5–6 is the same fastener.

While the sliding mechanism 30 illustrated in FIGS. 5–6 provide a blade 34, those skilled in the art will appreciate that other types of sliding mechanisms (e.g., a saucer, an intertube, a belt system, skiis, etc.) may be configured for coupling to or association with receiver 14.

Accordingly, in at least some embodiments, a multi-seasonal recreational sled device may be used in all seasons and in all climates. In one embodiment, the winter sliding mechanism includes a saucer that is selectively coupled to the seat and/or the receiver for use in sliding down a snowy/icy slope. Moreover embodiments of the present invention include runners that optionally include steering capabilities for the summer and/or winter months. Moreover, embodiments of the present invention also embrace the interconnection of multiple sleds together for use during winter or non-winter months.

Embodiments of the present invention may further include the use of a seat strap to secure the individual onto the device. Embodiments of the present invention may further include a padded seat, springs, suspension, and/or other similar mechanisms. The embodiments of the present invention may further include a variety of patterns, designs, attachments, or other special features that may be integrated, applied, or attached in production or by the customer.

Thus, as discussed herein, the embodiments of the present invention embrace systems and methods for providing a recreational sled device. In particular, the present invention relates to systems and methods for providing a sled that is configured to selectively enable a user to carry a sliding mechanism up an incline and/or support the user on the mechanism and allow the user to travel a distance down the incline. In at least some embodiments of the present invention, the recreational sled device is multi-seasonal, wherein the sled device includes a winter portion for selective use down a snowy/icy incline and a non-winter portion for selective use down a non-snowy/non-icy incline.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A multi-seasonal recreational sled device comprising:
   a user-supporting portion configured to support a user; and
   a fixed containing mechanism coupled to the user-supporting portion, wherein the fixed containing mechanism is configured to interchangeably receive a sliding mechanism and to prevent the sliding mechanism from escaping from underneath the user-supporting portion when the multi-seasonal recreational sled device is supporting the user, and wherein the sliding mechanism is:
   (i) a block of ice when the multi-seasonal recreational sled device is used in non-winter weather conditions; and
   (ii) a winter sliding mechanism when the multi-seasonal recreational sled device is used in winter weather conditions.

2. A multi-seasonal recreational sled device as recited in claim 1, wherein the block of ice may be rotated about a longitudinal axis so that any one of a plurality of sides of the block of ice may be used to enable sliding in the non-winter weather conditions.

3. A multi-seasonal recreational sled device as recited in claim 1, wherein the fixed containing mechanism includes a top coupled to a front wall, a back wall and two side walls, and wherein the fixed containing mechanism allows the block of ice to move within an enclosure defined by the top, the front wall, the back wall and the two side walls.

4. A multi-seasonal recreational sled device as recited in claim 1, wherein the containing mechanism comprises one or more fasteners.

5. A multi-seasonal recreational sled device as recited in claim 1, wherein the winter sliding mechanism comprises at least one of:
   (i) a slick surface;
   (ii) a blade;
   (iii) a ski;
   (iv) an intertube;
   (v) a saucer;
   (vi) a wheel;
   (vii) a belt system;
   (viii) a roller; and
   (ix) a track.

6. A multi-seasonal recreational sled device as recited in claim 4, wherein the one or fasteners more couple the sliding mechanism to the fixed containing mechanism.

7. A multi-seasonal recreational sled device comprising:
   a user-supporting portion configured to support a user; and
   a fixed containing mechanism coupled to the user-supporting portion, wherein the fixed containing mechanism is configured to receive a block of ice, to prevent the block of ice from escaping from underneath the user-supporting portion when the multi-seasonal recreational sled device is supporting the user, and to facilitate the carrying of the block of ice up an incline, wherein the block of ice is one of a plurality of interchangeable sliding mechanisms that the fixed containing mechanism is configured to selectively and interchangeably receive, and wherein the interchangeable sliding mechanisms further include winter and non-winter sliding mechanisms, including:
   (i) a slick surface;
   (ii) a blade;
   (iii) a ski;
   (iv) an intertube;
   (v) a saucer;
   (vi) a wheel;
   (vii) a belt system;
   (viii) a roller; and
   (ix) a track.

8. A multi-seasonal recreational sled device as recited in claim 7, wherein the block of ice may be rotated about a longitudinal axis so that any one of a plurality of sides of the block of ice may be selectively employed to enable sliding.

9. A multi-seasonal recreational sled device as recited in claim 7, wherein the fixed containing mechanism includes a top coupled to a back wall and two side walls plurality of walls, and wherein the fixed containing mechanism allows the block of ice to move between the back wall and two side walls.

10. A multi-seasonal recreational sled device as recited in claim 7, wherein the containing mechanism comprises one or more fasteners, and wherein the one or more fasteners secure any one of the interchangeable sliding mechanisms to the fixed containing mechanism.

11. A method for providing a multi-seasonal recreational sled device, the method comprising:
    configuring a user-supporting portion to support a user;
    coupling a containing mechanism to the user-supporting portion, wherein the containing mechanism is configured to interchangeably receive of a plurality of sliding mechanisms, wherein the plurality of sliding mechanisms include a block of ice and a winter sliding mechanism;
    enabling the block of ice to be used in non-winter weather conditions to allow the user to slide down an incline; and
    enabling a winter sliding mechanism to be used in winter weather conditions to allow the user to slide down the incline.

12. A method as recited in claim 11, wherein the winter sliding mechanism includes one of:
    (i) a slick surface;
    (ii) a blade;
    (iii) a ski;
    (iv) an intertube; and
    (v) a saucer.

* * * * *

UNITED STATES PATENT AND TRADEMARK OFFICE
CERTIFICATE OF CORRECTION

PATENT NO. : 6,729,651 B2  Page 1 of 1
DATED : May 4, 2004
INVENTOR(S) : Bryan L. Pace It is certified that error appears in the above-identified patent and that said Letters Patent is hereby corrected as shown below:

Column 9,
Line 66, after "fasteners", delete "more", and infront of "fasteners", add "more"

Column 10,
Line 48, in front of "of", add "one" (First occurrence)

Signed and Sealed this

Twenty-ninth Day of June, 2004

JON W. DUDAS
*Acting Director of the United States Patent and Trademark Office*